(12) United States Patent
Multani et al.

(10) Patent No.: US 12,737,722 B2
(45) Date of Patent: Sep. 15, 2026

(54) INVENTORY INTELLIGENCE FOR PARTS USING COMBINATION METADATA IDENTIFIER

(71) Applicant: eBay Inc., San Jose, CA (US)

(72) Inventors: Sarabdeep Singh Multani, San Jose, CA (US); Suhas Giridhar Danavandi, Pleasanton, CA (US); Prathihasth Rekabu, San Jose, CA (US)

(73) Assignee: eBay Inc., San Jose, CA (US)

( * ) Notice: Subject to any disclaimer, the term of this patent is extended or adjusted under 35 U.S.C. 154(b) by 135 days.

(21) Appl. No.: 18/618,791

(22) Filed: Mar. 27, 2024

(65) Prior Publication Data

US 2025/0307769 A1 Oct. 2, 2025

(51) Int. Cl.
*G06Q 10/0875* (2023.01)

(52) U.S. Cl.
CPC ................................ *G06Q 10/0875* (2013.01)

(58) Field of Classification Search
CPC ........... G06Q 10/0875; G06Q 30/0631; G06Q 30/0625
See application file for complete search history.

(56) References Cited

U.S. PATENT DOCUMENTS 8,463,658 B2 6/2013 Racco
11,250,015 B2 2/2022 Kadel et al.
2010/0094723 A1 4/2010 Johnson et al.
2011/0238534 A1 9/2011 Yakkala
2013/0036028 A1 2/2013 Patt et al.
2013/0036029 A1 2/2013 Patt et al.
2015/0199743 A1* 7/2015 Pinel ................. G06Q 30/0631 705/26.7
2018/0189858 A1 7/2018 Melcher et al.
2021/0295251 A1 9/2021 Grande et al.

(Continued)

FOREIGN PATENT DOCUMENTS

EP 4283496 A1 11/2023

OTHER PUBLICATIONS

Extended European Search Report received for European Patent Application No. 25166609.5, mailed on May 15, 2025, 8 pages.

(Continued)

*Primary Examiner* — Aaron Tutor
(74) *Attorney, Agent, or Firm* — Shook Hardy & Bacon L.L.P.

(57) ABSTRACT

Some aspects relate to technologies for employing metadata identifiers for part item listings on a listing platform to generate inventory intelligence. In accordance with some aspects, textual analysis of listing data for each of a plurality of part item listings on a listing platform is performed to assign a metadata identifier to each part item listing. The metadata identifier for each part item listing comprises a combination of an inventory segment identifier, a category identifier, and fitment data. For a first metadata identifier, a set of part item listings having the first metadata identifier is identified. Demand data and/or supply data is aggregated for the set of part item listings to provide aggregated data. A user interface with one or more metrics is generated using the aggregated data, and the user interface is communicated over a network to a computing device for presentation.

15 Claims, 8 Drawing Sheets

(56) References Cited

U.S. PATENT DOCUMENTS

2022/0253871 A1 * 8/2022 Miller .................... G06F 16/36

OTHER PUBLICATIONS

Amazon : "Providing ACES Data to Amazon Automotive", Amazon, Sep. 1, 2016, pp. 1-20.

Pan et al., "Additem", ebay developers program, Available at : <https://developer.ebay.com/devzone/XML/docs/reference/ebay/additem.html>, Oct. 3, 2023, pp. 1-902.

Takaki, M., "eBay Makes It Easier to Find All the Parts You Need for That Repair", Recommender Systems in Product, Dec. 6, 2017, pp. 1-4.

* cited by examiner

Inventory Intelligence : Existing Opportunity

Hello carpartsexampleseller,
Discover specially selected areas of opportunities tailored just for you!

302

← Meta ID →

| Leaf Categ Name | Inventory Seg | Make | Model | Year | Dominant Brand & MPN | GMV Opportunity | Confid. Scale | Listing Demand | Demand Conv. | Seller Live Listing | Seller avg Listing Price | Overall Live Listing | Entry Level Price | Top-tier Price |
|---|---|---|---|---|---|---|---|---|---|---|---|---|---|---|
| Headlight Assemblies | After Market | Chevrolet | Silverado 1500 | 2018 | brand: vland, mpn: spyax5vr6006 | $554.8K | High | ▲ 4.0 | ▼ 16.0% | 47 | $1,443 | 1,132 | $334 | $618 |
| Bumpers & Reinforcements | After Market | Chevrolet | Silverado 1500 | 2022 | brand: auxito, mpn: rbc928 | $350.9K | High | ▲ 8.8 | ▼ 10.5% | 30 | $32 | 427 | $219 | $676 |
| Bumpers & Reinforcements | After Market | Chevrolet | Camaro | 2022 | brand: auxito, mpn: rbc928 | $340.3K | High | ▲ 8.7 | ▼ 10.0% | 28 | $95 | 280 | $46 | $158 |
| Headlight Assemblies | After Market | Lexus | IS F | 2012 | brand: vland, mpn: yaais0303 | $237.5K | High | ▲ 3.4 | ▼ 14.4% | 4 | $29 | 921 | $338 | $440 |
| Bumper Inserts & Covers | After Market | Honda | Civic | 1996 | brand: n/a, mpn: 91505s9a003 | $237.0K | High | ▲13.4 | ▼ 6.1% | 20 | $208 | 109 | $101 | $148 |
| Bumper Inserts & Covers | After Market | Honda | Civic | 1997 | brand: dorman products, mpn: 963500 | $234.6K | High | ▲ 6.6 | ▼ 6.2% | 20 | $208 | 223 | $18 | $28 |
| Bumper Inserts & Covers | After Market | Honda | Civic | 1998 | brand: dorman products, mpn: 963500 | $234.6K | High | ▲ 6.6 | ▼ 6.2% | 20 | $208 | 223 | $18 | $28 |
| Bumper Inserts & Covers | After Market | Honda | Civic | 1999 | brand: dorman products, mpn: 963500 | $233.7K | High | ▲ 8.2 | ▼ 7.7% | 10 | $138 | 209 | $17 | $24 |
| Bumper Inserts & Covers | After Market | Honda | Civic | 2000 | brand: dorman products, mpn: 963500 | $233.7K | High | ▲ 8.2 | ▼ 7.7% | 10 | $138 | 209 | $17 | $24 |
| Headlight Assemblies | After Market | Lexus | IS F | 2009 | brand: vland, mpn: yaais0303 | $204.3K | High | ▲ 3.4 | ▼ 15.0% | 5 | $45 | 945 | $328 | $440 |

*FIG. 3*

Inventory Intelligence : New Opportunity

Hello carpartsexampleseller,
Discover specially selected areas of opportunities tailored just for you!

402
← Meta ID →

| Leaf Categ Name | Inventory Seg | Make | Model | Year | Dominant Brand & MPN | GMV Opportunity | Confid. Scale | Listing Demand | Demand Conv. | Seller Live Listing | Seller avg Listing Price | Overall Live Listing | Entry Level Price | Top-tier Price |
|---|---|---|---|---|---|---|---|---|---|---|---|---|---|---|
| Headlight Assemblies | After Market | BMW | 325I | 2012 | brand: auxito, mpn: h7headlight | $321.4K | High | ▲ 5.0 | ▼ 14.6% | - | - | 593 | $57 | $146 |
| Headlight Assemblies | After Market | BMW | 325I | 2011 | brand: hella, mpn: 354692051 | $221.9K | High | ▲ 3.6 | ▼ 14.1% | - | - | 567 | $59 | $235 |
| Bumpers & Reinforcements | After Market | Chevrolet | Silverado 2500 | 2006 | brand: perfect fit auto parts, mpn: 9599208 | $200.1K | High | ▲15.2 | ▼ 11.3% | - | - | 184 | $97 | $374 |
| Bumpers & Reinforcements | After Market | Chevrolet | Silverado 2500 | 2005 | brand: arb, mpn: 3462020 | $194.3K | High | ▲15.7 | ▼ 9.4% | - | - | 153 | $69 | $176 |
| Tail Light Assemblies | After Market | Chevrolet | Corvet_ | 2006 | brand: anzo, mpn: 321169 | $190.6K | High | ▲ 3.7 | ▼ 14.2% | - | - | 377 | $118 | $278 |
| Tail Light Assemblies | After Market | Chevrolet | Corvet_ | 2008 | brand: anzo, mpn: 321169 | $189.9K | High | ▲ 3.7 | ▼ 14.3% | - | - | 380 | $118 | $278 |
| Tail Light Assemblies | After Market | Chevrolet | Corvet_ | 2005 | brand: anzo, mpn: 321168 | $186.2K | High | ▲ 4.1 | ▼ 14.4% | - | - | 335 | $119 | $295 |
| Tail Light Assemblies | After Market | Chevrolet | Corvet_ | 2011 | brand: anzo, mpn: 321168 | $179.9K | High | ▲ 3.3 | ▼ 14.3% | - | - | 377 | $118 | $278 |
| Tail Light Assemblies | After Market | Chevrolet | Corvet_ | 2010 | brand: anzo, mpn: 321168 | $173.7K | High | ▲ 3.3 | ▼ 14.6% | - | - | 388 | $118 | $278 |
| Tail Light Assemblies | After Market | Chevrolet | Corvet_ | 2013 | brand: n/a mpn: 15279352 | $171.9K | High | ▲ 5.1 | ▼ 15.6% | - | - | 308 | $59 | $148 |

*FIG. 4*

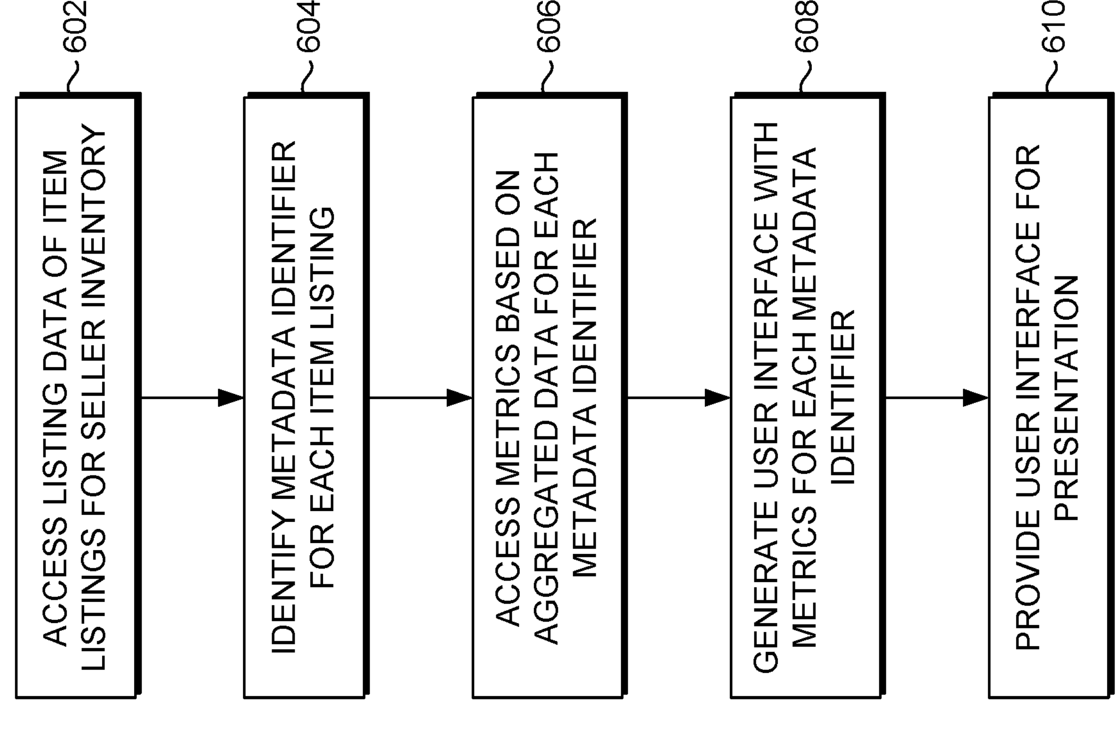
*FIG. 6*

INVENTORY INTELLIGENCE FOR PARTS USING COMBINATION METADATA IDENTIFIER

BACKGROUND

Listing platforms, such as e-commerce websites, are online platforms that offer products, services, digital content (e.g., music, videos, etc.), or other items to users. Such platforms typically offer a vast number of items. Listing platforms often provide metrics regarding items available on the platforms to assist sellers in managing their inventories on the listing platforms. Some categories of items, such as automobile parts, present a particular challenge for generating such metrics given the vast number of parts and the compatibility of the parts with different automobiles.

SUMMARY

Some aspects of the present technology relate to, among other things, employing metadata identifiers for part item listings on a listing platform to generate inventory intelligence. In accordance with some aspects, textual analysis of listing data for each of a plurality of part item listings on a listing platform is performed to assign a metadata identifier to each part item listing. The metadata identifier for each part item listing comprises a combination of an inventory segment identifier, a category identifier, and fitment data. To generate metrics for a given metadata identifier, a set of part item listings having that metadata identifier on the listing platform is identified. Demand data and/or supply data is aggregated for the set of part item listings to provide aggregated data, which is used to generate metrics for the metadata identifier. A user interface is generated that identifies the metadata identifier and its associated metrics, and the user interface is communicated, over a network to a user device for presentation.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 3 is a diagram showing a user interface providing metrics for metadata identifiers for part item listings in a seller's inventory on a listing platform in accordance with some implementations of the present disclosure;

FIG. 4 is a diagram showing a user interface providing metrics for metadata identifiers presenting new listing opportunities for a seller based on part item listings in the seller's inventory on a listing platform in accordance with some implementations of the present disclosure;

FIG. 6 is a flow diagram showing a method for providing metrics for a seller's existing inventory using metadata identifiers in accordance with some implementations of the present disclosure;

DETAILED DESCRIPTION

Overview

Figure 1:
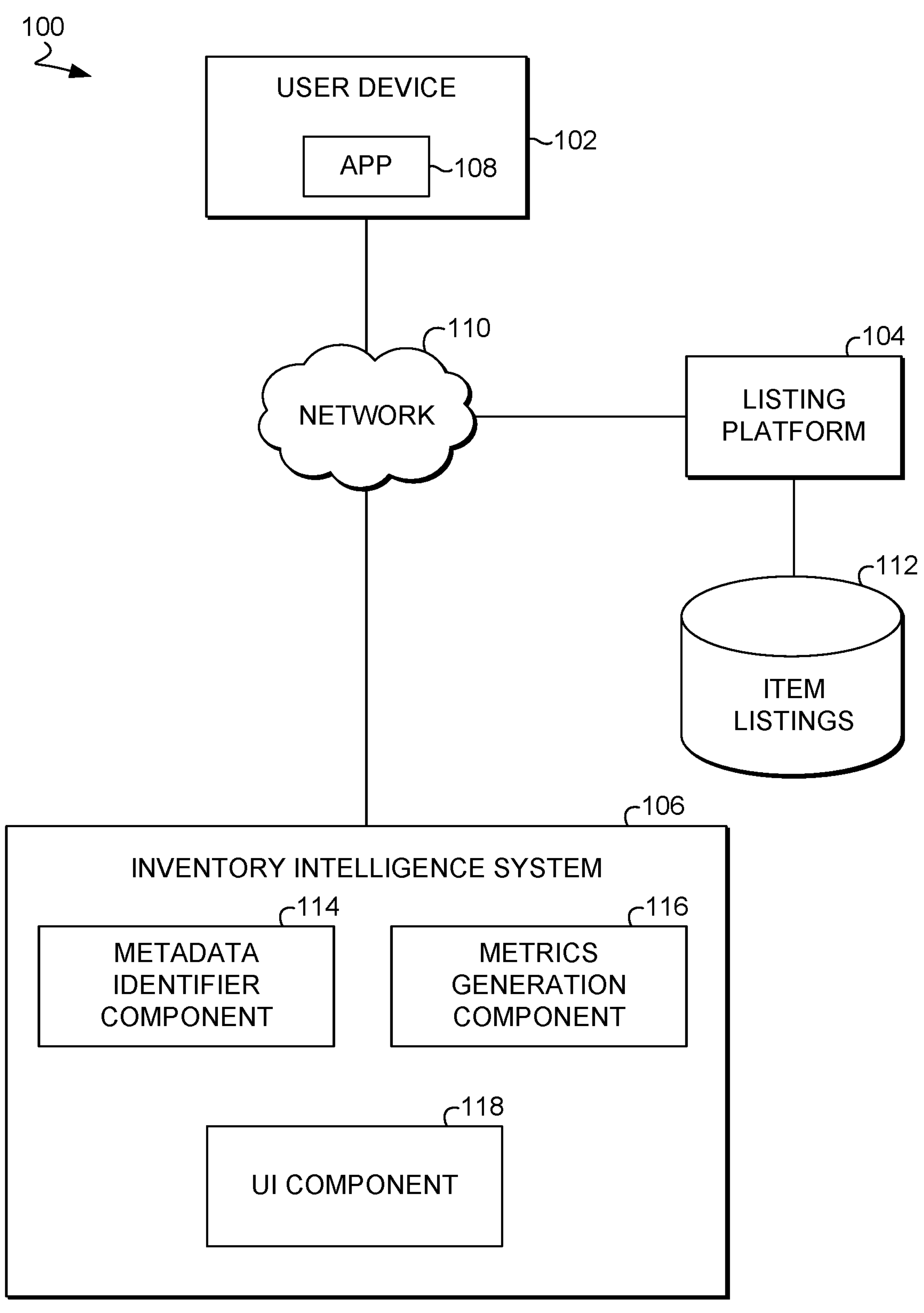
FIG. 1 is a block diagram illustrating an exemplary system in accordance with some implementations of the present disclosure.

Providing inventory intelligence for automobile parts on a listing platform poses challenges. In particular, there are often a large number of different item listings for parts with those parts being compatible with various automobiles. As a result of the large number of parts and various compatibility of automobiles based on, for instance, year, make, model, and the like, providing intelligence for parts on a listing platform, such as parts that are in high demand, demand-supply gaps, and pricing information, is challenging.

In some cases, sellers turn to search engines on listing platforms to try to glean information. For instance, sellers can search for similar parts listed on a listing platform to gather intelligence. However, this relies on the sellers to perform many searches, resulting in the consumption of an unnecessary quantity of computing resources (e.g., I/O costs, network packet generation costs, throughput, memory consumption, etc.). For instances, even for a single part, a seller may need to enter multiple search queries to identify relevant comparisons. This process unnecessarily consumes various computing resources of the listing platform, such as processing power, network bandwidth, throughput, memory consumption, etc. In some instances, the multiple attempts to identify relevant parts may even completely fail to satisfy the user's goal, thus requiring the user to spend even more time and computing resources by repeating the process of issuing additional queries until the user finally accesses the desired information or gives up.

These shortcomings of existing technologies adversely affect computer network communications. For example, each time a query is received, contents or payload of the search queries is typically supplemented with header information or other metadata, which is multiplied by all the additional queries needed to obtain the particular items the user desires to complete a task. As such, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if multiple users repetitively issue queries, it is expensive because processing queries consumes a lot of computing resources. For example, for some search engines, a query execution plan may need to be calculated each time a query is issued, which requires a search system to find the least expensive query execution plan to fully execute the query. This decreases throughput and increases network latency, and can waste valuable time.

Aspects of the technology described herein improve the functioning of the computer itself in light of these shortcomings in existing technologies by providing a solution that employs metadata identifiers for automobile parts to generate inventory intelligence. In accordance with the technology described herein, a metadata identifier comprises a combination of an inventory segment identifier, a category identifier, and fitment data. An inventory segment identifier indicates an inventory segment for an automobile part that generally identifies a source and/or condition of an automobile part, such as a salvage part, original equipment part, an aftermarket part, or a private label part. A category identifier indicates a category of an automobile part, which can correspond to a category from a hierarchical taxonomy of categories for a listing platform. Fitment data indicates compatibility of a part with an automobile, for instance by identifying a compatible make, model, year, trim, and engine.

In accordance with some aspects of the technology described herein, listing data from item listings for automobile parts on a listing platform is analyzed to assign a metadata identifier to each item listing. For instance, structured data and/or unstructured data for an item listing can be analyzed to select a particular inventory segment identifier, category identifier, and fitment data to generate the metadata identifier for the item listing. Each metadata identifier can be stored in association with its corresponding item listing to facilitate generating inventory intelligence.

Each metadata identifier can be used to generate metrics around the metadata identifier. For instance, for a given metadata identifier, part item listings having that metadata identifier are identified. Demand data and/or supply data is accessed for those part item listings and aggregated to generate metrics for the metadata identifier. Various user interfaces are generated to present metadata identifiers and their associated metrics. For instance, a user interface can be generated that presents metrics for metadata identifiers for part item listings in a given seller's inventory on a listing platform. As another example, a user interface can be generated that presents metrics for metadata identifiers that present new opportunities for a seller on a listing platform.

Aspects of the technology described herein provide a number of improvements over existing technologies. For instance, the assignment of metadata identifiers to part item listings allows data for similar parts with similar automobile compatibility to be aggregated, such that metrics can be provided around each metadata identifier. Such data aggregation and metrics generation was not previously possible. The ability to generate metrics in this manner, in turn, improves computing resource consumption relative to existing technologies. In particular, this eliminates (or at least reduces) the repetitive user queries sellers perform to try to glean information for parts on a listing platform. Accordingly, aspects of the technology described herein decrease computing resource consumption, such as processing power and network bandwidth. For instance, fewer user queries (e.g., an HTTP request), would need to traverse a computer network relative to existing technologies.

In like manner, aspects of the technology described herein improve storage device or disk I/O and query execution functionality. As described above, the inability of existing listing platforms to provide intelligence around automobile parts often resulted in repetitive user queries. This causes multiple traversals to disk I/O. In contrast, aspects described herein reduce storage device I/O because the user provides a reduced amount of inputs so the computing system does not have to reach out to the storage device as often to perform a read or write operation.

Example System for Generating Inventory Intelligence for Parts Using Metadata Identifiers With reference now to the drawings, FIG. 1 is a block diagram illustrating an exemplary system 100 for providing inventory intelligence for part item listings on a listing platform based on metadata identifiers in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102, a listing platform 104, and an inventory intelligence system 106. Each of the user device 102, the listing platform 104, and the inventory intelligence system 106 shown in FIG. 1 can comprise one or more computer devices, such as the computing device 800 of FIG. 8, discussed below. As shown in FIG. 1, the user device 102, the listing platform 104, and the inventory intelligence system 106 can communicate via a network 110, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the listing platform 104 and the inventory intelligence system 106 could each be provided by multiple server devices collectively providing the functionality of the listing platform 104 and the inventory intelligence system 106 as described herein. Additionally, other components not shown may also be included within the network environment.

The user device 102 can be a client device on the client-side of operating environment 100, while the listing platform 104 and the inventory intelligence system 106 can be on the server-side of operating environment 100. The listing platform 104 and/or the inventory intelligence system 106 can each comprise server-side software designed to work in conjunction with client-side software on the user device 102 so as to implement any combination of the features and functionalities discussed in the present disclosure. For instance, the user device 102 can include an application 108 for interacting with the listing platform 104 and/or the inventory intelligence system 106. The application 108 can be, for instance, a web browser or a dedicated application for providing functions, such as those described herein. This division of operating environment 100 is provided to illustrate one example of a suitable environment, and there is no requirement for each implementation that any combination of the listing platform 104 and the inventory intelligence system 106 remain as separate entities. For instance, in some aspects, the inventory intelligence system 106 is a part of the listing platform 104. While the operating environment 100 illustrates a configuration in a networked environment with a separate user device, listing platform, and inventory intelligence system, it should be understood that other configurations can be employed in which aspects of the various components are combined.

The user device 102 may comprise any type of computing device capable of use by a user. For example, in one aspect, a user device may be the type of computing device 800 described in relation to FIG. 8 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user may be associated with the user device 102 and may interact with the listing platform 104 and/or the inventory intelligence system 106 via the user device 102.

The listing platform 104 can be implemented using one or more server devices, one or more platforms with corresponding application programming interfaces, cloud infrastructure, and the like. The listing platform 104 generally provides, to user devices such as the user device 102, item listings describing items (physical or digital) available for purchase, rent, streaming, download, etc. For instance, the listing platform 104 could comprise an e-commerce platform, in which listed products or services are available for purchase by users of the user device 102 upon navigation to the listing platform 104. In accordance with various aspects described herein, the item listings available on the listing platform 104 include listings for automobile parts.

The functionality of the listing platform 104 includes provision of interfaces enabling surfacing of item listings for items to users of the listing platform 104. Item listings for items available for sale/rent/consumption via the listing platform 104 are stored by the item listings data store 112. Each item listing may include a description relating to an item comprising one or more of a price in a currency, reviews, images of the item, shipment options, a rating, a condition of the item, a size of the item, a color of the item, etc. In aspects, each item is associated with one or more categories from a category hierarchy for the listing platform, including meta-categories and leaf categories. For example, the meta-categories are each divisible into subcategories (or branch categories), whereas leaf categories are not divisible.

The inventory intelligence system 106 provides inventory intelligence by leveraging metadata identifiers assigned to item listings on the listing platform 104, as will be described in further detail below. As shown in FIG. 1, the inventory intelligence system 106 includes a metadata identifier component 114, a metrics generations component 116, and a user interface component 118. The components of the inventory intelligence system 106 may be in addition to other components that provide further additional functions beyond the features described herein. The inventory intelligence system 106 can be implemented using one or more server devices, one or more platforms with corresponding application programming interfaces, cloud infrastructure, and the like. While the inventory intelligence system 106 is shown separate from the listing platform 104 and the user device 102 in the configuration of FIG. 1, it should be understood that in other configurations, some of the functions of the inventory intelligence system 106 can be provided on the listing platform 104 and/or the user device 102. Additionally, while the components 114, 116, 118 are shown as part of the inventory intelligence system 106, in other configurations, one or more of the components can be provided by the listing platform 104 or another location not shown in FIG. 1. The components can be provided by a single entity or multiple entities.

In some aspects, the functions performed by components of the inventory intelligence system 106 are associated with one or more applications, services, or routines. In particular, such applications, services, or routines may operate on one or more user devices or servers, may be distributed across one or more user devices and/or servers, or be implemented in the cloud. Moreover, in some aspects, these components of the inventory intelligence system 106 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

Figure 2:
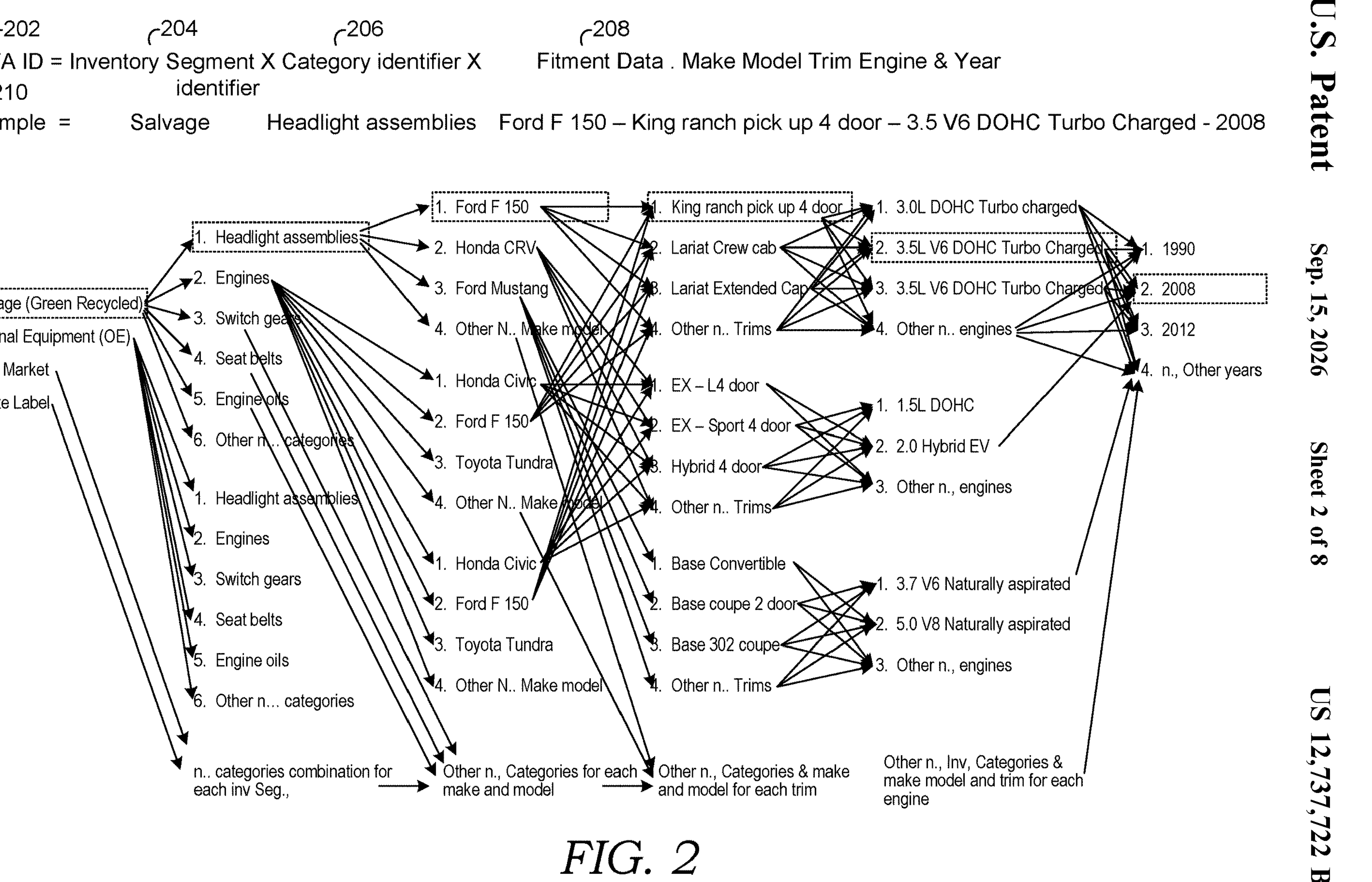
FIG. 2 is a diagram showing an example of a metadata identifier in accordance with some implementations of the present disclosure.

The metadata identifier component 112 of the inventory intelligence system 106 assigns metadata identifiers to item listings for automobile parts available in the item listings data store 112 of the listing platform 104. The metadata identifiers serve as unique inventory identifiers for automobile parts with distinct properties that benefit downstream applications. FIG. 2 provides an example illustrating a metadata identifier for an automobile part in accordance with some aspects. As shown in FIG. 2, a metadata identifier 202 is a combination of an inventory segment identifier 204, a category identifier 206, and fitment data 208. An example metadata identifier 210 shown is: Salvage; Headlight assemblies; Ford F 150—King ranch pick up 4 door—3.5 V6 DOHC Turbo Charged—2008.

The inventory segment identifier 204 of the metadata identifier 202 indicates an inventory segment for an automobile part that generally identifies a source and/or condition of an automobile part. Each inventory segment may cater to different consumer preferences, budget considerations, and quality standards, offering a range of choices when selecting replacement parts. Examples of inventory segments include the following:

- Salvage Parts: Salvage parts refer to components salvaged from vehicles that have been damaged or deemed unusable for regular operation. These parts are often obtained from junkyards or through salvage auctions. Salvage parts may undergo refurbishment or repair before being resold.

Original Equipment Manufacturer (OEM) Parts: OEM parts are produced by the same manufacturer that originally made the parts for the vehicle when it was built. These parts are designed to meet the specifications and quality standards set by the vehicle manufacturer. They are often considered the highest quality option and are typically sold through authorized dealerships or directly from the manufacturer.

Aftermarket Parts: Aftermarket parts are produced by third-party manufacturers not affiliated with the original vehicle manufacturer. These parts are designed to fit and function similarly to OEM parts but may offer variations in design, materials, or performance. Aftermarket parts are often more affordable than OEM parts and are widely available through various retailers, auto parts stores, and online marketplaces.

Private Label Parts: Private label parts, also known as store brand or white label parts, are produced by third-party manufacturers but sold under a retailer's brand name. These parts are often manufactured to meet specific requirements or specifications set by the retailer. Private label parts can offer a balance between quality and affordability, providing consumers with alternative options for car repairs and maintenance.

The category identifier 206 of the metadata identifier 202 indicates a category of an automobile part. By way of example, the categories for automobile parts could include: headlight assemblies, engines, switch gears, seat belts, engine oils, bumper, tail light assemblies, etc. The categories available to the category identifier 206 can be based on a hierarchical taxonomy of categories for the listing platform (e.g., the listing platform 104 of FIG. 1). In some aspects, only leaf node categories are available for the category identifier 206. In other aspects, any level of categories can be employed for the category identifier 206. The category identifier 206 for an automobile part can identify a single category or multiple categories.

The fitment data 208 of the metadata identifier 202 provides information about the compatibility of an automotive part with a specific automobile. The fitment data identifies which automobiles an automotive part is designed to fit and function properly with. By way of example only and not limitation, the fitment data 208 can include any combination of the following: make (i.e., the brand or manufacturer of the vehicle, such as Toyota, Ford, BMW, etc.); model (i.e., specific model of the vehicle, such as Camry, F-150, 3 Series, etc.); year (i.e., the year of manufacture of the vehicle, such as 2010, 2015, 2020, etc.); trim (i.e., a specific version or variant of a vehicle model that typically distinguishes different levels of features, options, and configurations available for that model); and engine (i.e., engine specifications providing details about the engine, such as horsepower, torque, fuel type, and emission standards). The fitment data 208 may be based on a fitment graph that identifies relationships between various parts of the fitment data, such as, for instance, what makes go with which models, what trims go with which makes, etc.

As indicated above, the metadata identifier component 114 assigns metadata identifiers to item listings for automobile parts available on the listing platform 104. The metadata identifier for each part item listing can be stored in the item listings data store 112 in association with the listing data and/or item listing identifier for the corresponding item listing to facilitate downstream applications, as will be discussed in further detail below.

In some aspects, the metadata identifier component 114 analyzes listing data for a part item listing to automatically generate a metadata identifier to assign to the part item listing. More particularly, the metadata identifier component 114 accesses listing data for the item listing (e.g., from the item listing data store 112) in order to select an inventory segment identifier, a category identifier, and fitment data. To generate the metadata identifier for an item listing, the metadata identifier component 114 analyzes the listing data for the item listing and selects: (1) an inventory segment identifier, for instance, from a set of identifiers, such as salvage, original equipment, after market, and private label; (2) a category identifier, for instance, from a hierarchical category taxonomy for item listings on the listing platform; and (3) fitment data, for instance, from a fitment graph identifying possible combinations of makes, models, years, trims, and/or engines.

The listing data for each item listing can comprise a combination of structured data and unstructured data. Structured data comprises information that is organized in a specific format, typically with well-defined fields and fixed data types. The structured data can be in the format of attribute-value pairs, in which a specific attribute is identified and a value for that attribute is also provided. For instance, in the context of an item listing for an automobile part, the item listing could have attribute-value pairs such as "category:headlight assembly" and "make:Mazda". Unstructured data comprises information that lacks a specific, pre-defined organization or format. For instance, the title and the item description for an item listing could comprise unstructured text identifying and describing the item without any particular organization.

In some aspects, to generate a metadata identifier for an item listing, the metadata identifier component 114 first analyzes structured data in the listing data for the item listing. The metadata identifier component 114 can search for attribute-value pairs with attributes corresponding to the components of the metadata identifier. For instance, the metadata identifier component 114 can search the structured data for particular pre-determined attributes, such as: category, make, model, year, etc. Each of those pre-determined attributes can be assigned to a particular component of the metadata identifier. For instance, a category attribute would correspond to the category identifier portion of the metadata identifier, while make, model, and year attributes would correspond to the fitment data portion of the metadata identifier. When the metadata identifier component 114 identifies an attribute-value pair with a pre-determined attribute, the metadata identifier component 114 uses the value from the attribute-value pair to select an identifier for a portion of the metadata identifier corresponding with the attribute from the attribute-value pair. For instance, if the structured data for an item listing includes "category: headlight assemblies", the metadata identifier component 114 determines the "category" attribute of that attribute-value pair corresponds to the category identifier portion of the metadata identifier. As such, the value "headlight assemblies" is used to select the category identifier for the metadata identifier.

In some instances, the structured data for an item listing may provide sufficient information for the metadata identifier component 114 to select the inventory segment identifier, category identifier, and the fitment data, such that reliance on unstructured data is unnecessary. However, in other instances, the structured data for an item listing may not provide sufficient information to select one or more portions of the metadata identifier. In such instances, the metadata identifier component 114 analyzes the unstructured data for the item listing to select portions of the metadata identifier. The metadata identifier component 114 can use any of a variety of natural language processing (NLP) techniques to analyze the unstructured data. For instance, the metadata identifier component 114 could process the unstructured text to identify particular keywords that map to portions of the metadata identifier. The keywords could correspond to: the options available for the inventory segment identifier (e.g., salvage, original equipment, after market, private label); the options available for the category identifier (e.g., from a hierarchical taxonomy of categories for the listing platform 104); and the options available for the fitment data (e.g., specific makes, models, trims, etc. that could be set forth in a fitment graph). By way of example to illustrate, the title for an item listing could comprise: "Headlight assembly for Honda Accord". The metadata identifier component 114 could analyze the text of the title to determine the "headlight assembly" portion corresponds to the "Headlight assemblies" category identifier and to determine the "Honda Accord" portion corresponds to make and model, respectively, for the fitment data.

In some aspects, the metadata identifier component 114 leverages a machine learning model to generate metadata identifiers for item listings. The machine learning model can comprise a language model that includes a set of statistical or probabilistic functions to perform NLP in order to understand, learn, and/or generate human natural language content. For example, a language model can be a tool that determines the probability of a given sequence of words occurring in a sentence or natural language sequence. Simply put, it can be a model that is trained to predict the next word in a collection of text. A language model is called a large language model (LLM) when it is trained on enormous amount of data and/or has a large number of parameters. Some examples of LLMs are GOOGLE's BERT and OpenAI's GPT-3 and GPT-4. These models have capabilities ranging from writing a simple essay to generating complex computer codes-all with limited to no supervision. Accordingly, an LLM can comprise a deep neural network that is very large (billions to hundreds of billions of parameters) and understands, processes, and produces human natural language by being trained on massive amounts of text. These models can predict future words in a phrase letting them generate text similar to how humans talk and write. In certain aspects the present technology, the model is used to predict portions of the metadata identifier for an item listing.

In accordance with some aspects, the machine learning model used by the metadata identifier component 114 comprises a neural network. As used herein, a neural network comprises multiple operational layers, including an input layer and an output layer, as well as any number of hidden layers between the input layer and the output layer. Each layer comprises neurons. Different types of layers and networks connect neurons in different ways. Neurons have weights, an activation function that defines the output of the neuron given an input (including the weights), and an output. The weights are the adjustable parameters that cause a network to produce a correct output. The model used by the metadata identifier component 114 in some aspects can be pre-trained model that has not been fine-tuned, a model built from scratch, or a pre-trained model that has been fine-tuned for generating metadata identifiers for item listings.

In some configurations, the model used by the metadata identifier component 114 is a pre-trained model (e.g., GPT-4) that has not been fined-tuned. In other configurations, the model is a model that is built and trained from scratch or a pre-trained model that has been fine-tuned. In such configurations, the model can be trained or fine-tuned using training data. For instance, the training data can comprise pairs of data in which listing data from an item listing is paired with a ground truth metadata identifier for that item listing. During training, weights associated with each neuron can be updated. Originally, the model can comprise random weight values or pre-trained weight values that are adjusted during training. In one aspect, the model is trained using backpropagation. The backpropagation process comprises a forward pass, a loss function, a backward pass, and a weight update. This process is repeated using the training data. For instance, each iteration could include providing listing data for an item listing to the model, generating a metadata identifier by the model based on the listing data, comparing (e.g., computing a loss) the metadata identifier from the model with the ground truth metadata identifier paired with the listing data, and updating the model based on the comparison. The goal is to update the weights of each neuron (or other model component) to cause the model to produce accurate metadata identifiers based on listing data for item listings. Once trained, the weight associated with a given neuron can remain fixed. The other data passing between neurons can change in response to a given input. Retraining the network with additional training data can update one or more weights in one or more neurons.

In further aspects of the technology described herein, the metadata identifier component 114 can facilitate manual assignment of metadata identifiers to item listings by users. For instance, the metadata identifier 114 could facilitate providing a user interface (e.g., via the user interface component 118 described below) to a user device, such as the user device 102. The user interface could allow for a user selection of an inventory segment identifier, category identifier, and fitment data for an item listing. For instance, drop down lists could be provide that present available options for each portion of the metadata identifier. For example, a drop down list for the inventory segment identifier could present the following options for selection: salvage, original equipment, after market, and private label. In some aspects, options available in drop down lists can be updated based on selections made in other drop down lists. For instance, if a particular make is selected, a drop down list for models could be limited to models within the selected make.

The metrics generation component 116 generates intelligence for automobile parts on the listing platform 104 using the metadata identifiers generated by the metadata identifier component 114. To generate metrics for a given metadata identifier, the metrics generation component 116 identifies item listings on the listing platform 104 having that metadata identifier. The metrics generation component 116 then aggregates data from those identified item listings to generate metrics for the metadata identifier. The data aggregated by the metrics generation component 116 can comprise, for instance, listing demand data (e.g., views, transactions, etc.) and supply data (number of item listings, attributes of item listings). The metrics for a given metadata identifier facilitate an understanding of demand, supply, gaps, and quality of supply for item listings with that metadata identifier.

Any of a variety of metrics can be generated for a metadata identifier by the metrics generation component 116. For instance, one metric is gross merchandise value (GMV) opportunity. GMV represents the total value of items sold through a particular marketplace or platform over a specific period of time, in some cases without factoring in discounts, returns, or other deductions. The GMV opportunity for a metadata identifier refers to the potential for generating revenue or sales of items having that metadata identifier. It essentially denotes the total market size in terms of the value of items having that metadata identifier that could be sold through a platform or marketplace. Another metric that could be generated by the metrics generation component 116 for a given metadata identifier is listing demand, which is a ratio metric based on the number of views (in some cases, by unique users) of item listings having the metadata identifier and the overall number of item listings having the metadata identifier. A further metric that could be generated by the metrics generation component 116 for a given metadata identifier is demand conversion, which is based on the percentage of users who end up purchasing an item via an item listing having the metadata identifier. Still further metrics that could be generated by the metrics generation component 116 for a given metadata identifier is pricing information for item listings having the metadata identifier, such as a price range (e.g., entry level price and top-tier price) and an average price. It should be understood that the above-discussed metrics are provided by way of example only and other metrics not discussed herein can be generated by the metrics generation component 116 within the scope of the technology described herein.

The user interface component 118 provides one or more user interfaces for interacting with the listing platform 104 and/or the inventory intelligence system 106. While shown as part of the inventory intelligence system 106 in FIG. 1, in some configurations, the user interface component 118 can be part of the listing platform 104 and/or the user device 102. The user interface component 118 provides one or more user interfaces or user interface data to a user device, such as the user device 102. In some instances, the user interfaces can be presented on the user device 102 via the application 108, which can be a web browser or a dedicated application for interacting with the listing platform 104 and/or the inventory intelligence system 106. For instance, the user interface component 118 can provide user interfaces for, among other things, presenting metrics for given metadata identifiers generated by the metrics generation component 116.

A variety of different user interfaces can be provided for presentation of metrics for metadata identifiers. By way of example only, in some cases, a user can specify a particular metadata identifier, and the inventory intelligence system 106 can provide metrics for that metadata identifier. For instance, a seller generating a new item listing could specific a metadata identifier for the item listing to obtain metrics.

In some cases, user interfaces are provided to present metrics for item listings within a seller's inventory on a listing platform. By way of example to illustrate, FIG. 3 is a diagram showing one example user interface 300 providing metrics for metadata identifiers for part item listings in a seller's inventory on a listing platform. In particular, the user interface 300 lists metadata identifiers 302 for item listings within the seller's inventory. The user interface 300 includes a row of metrics for each metadata identifier. For a given metadata identifier, the metrics includes the seller's own information, such as the number of live item listings having the metadata identifier and listing price information for item listings having the metadata identifier. The user interface further presents other metrics for each metadata identifier, such as the GMV opportunity, listing demand, overall item listings, and price information.

In further configurations, user interfaces are provided to present metrics for metadata identifiers that present new opportunities for a seller (i.e., the seller may not have any item listings with those metadata identifiers). By way of example to illustrate, FIG. 4 is a diagram showing another example user interface 400 providing metrics for metadata identifiers presenting new listing opportunities for a seller based on part item listings in the seller's inventory on a listing platform. In particular, the user interface 400 lists metadata identifiers 402 for which the seller does not have item listings on the listing platform. The metadata identifiers to present on the user interface 400 can be selected based on relevance of those metadata identifiers to metadata identifiers of item listings within the seller's inventory and ranking or metrics for those metadata identifiers. For instance, in some configurations, category identifiers of metadata identifiers of item listings in a seller's inventory can be identified. Based on those category identifiers, other metadata identifiers having those category identifiers can be identified, ranked based on their metrics, and presented based on the metrics rankings. For instance, in the example of FIG. 4, metadata identifiers have been ranked and ordered on the user interface 400 based on GMV opportunity.

Figure 5:
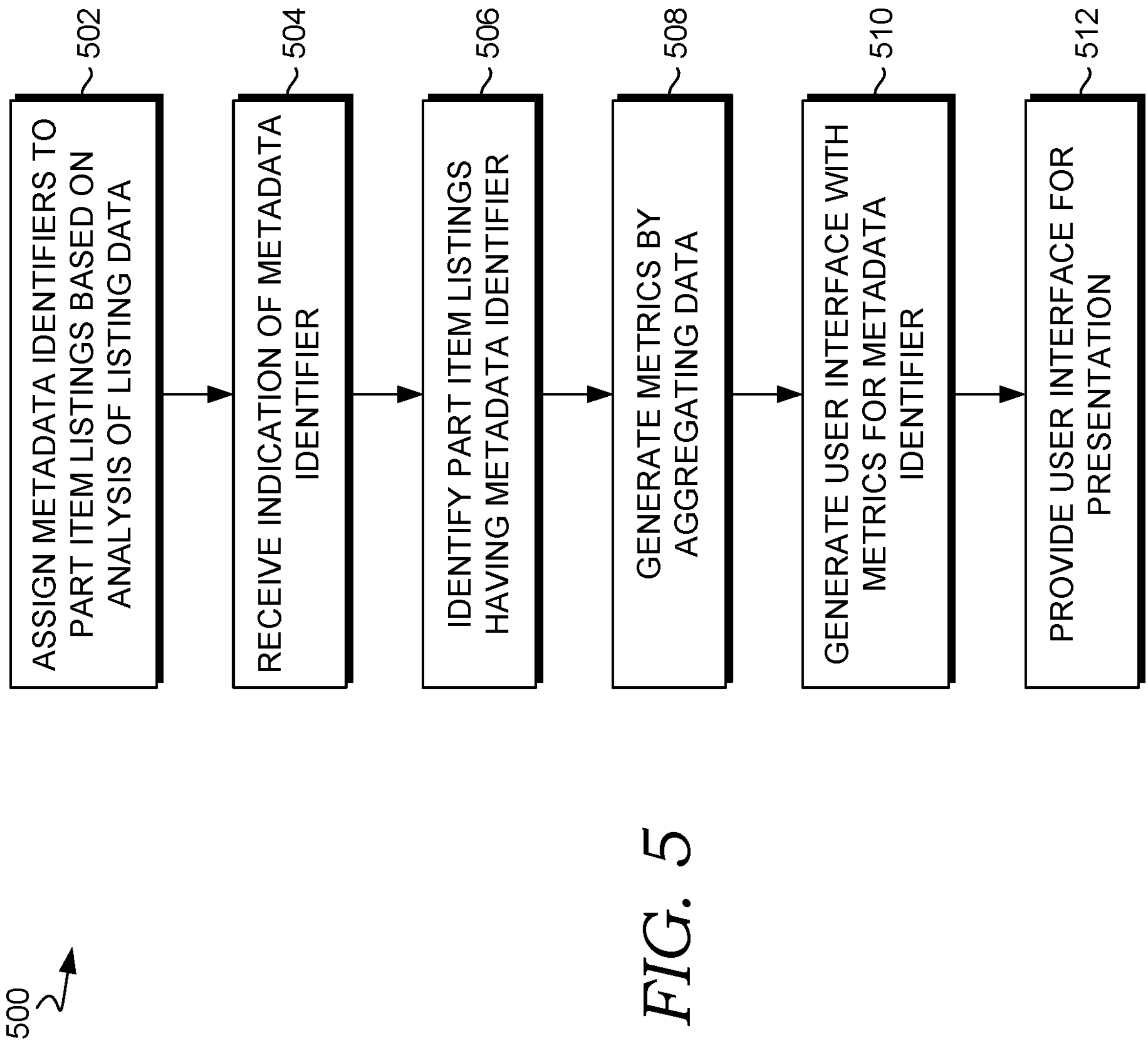
FIG. 5 is a flow diagram showing a method for providing inventory intelligence for part item listings on a listing platform based on metadata identifiers in accordance with some implementations of the present disclosure.

Example Methods for Generating Inventory Intelligence for Parts Using Metadata Identifiers With reference now to FIG. 5, a flow diagram is provided that illustrates an overall method 500 for providing inventory intelligence for part item listings on a listing platform based on metadata identifiers. The method 500 can be performed, for instance, by the inventory intelligence system 106 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, metadata identifiers are assigned to part item listings on a listing platform. In some aspects, the metadata identifiers are generated based on analysis of listing data associated with each part item listings. For instance, the listing data for the part item listings could be analyzed (e.g., by the metadata identifier component 114 of FIG. 1) to automatically identify relevant information from the listing data to generate the metadata identifier for each part item listing. For instance, structured data and/or unstructured data for a part item listing could be analyzed to select the inventory segment identifier, category identifier, and fitment data for generating the metadata identifier for the part item listing. In some aspects, metadata identifiers can be manually assigned to item listings. For instance, when a seller is generating an item listing for an automobile part, a user interface could be provided that allows the seller to make selections to define the metadata identifier for the item listing. Each generated metadata identifier (automatically and/or manually generated) is stored in association with its corresponding item listing. For instance, a metadata identifier could be stored in association with an item listing identifier that uniquely identifiers the item listing.

An indication of a metadata identifier is received at block 504. The metadata identifier could, for instance: correspond to an item listing in a seller's inventory; correspond with a new opportunity for a seller based on the seller's inventor;

correspond with a new item listing being added to the listing platform by a seller; or comprise a metadata identifier manually entered by a seller.

As shown at block 506, part item listings having the metadata identifier received at block 504 are identified. This could be performed, for instance, by searching an item listing data store (e.g., the item listing data store 112 of FIG. 1) for all part item listings with the metadata identifier. Depending on the context of the metrics to be generated, the item listings identified could be a particular seller's item listings with the metadata identifier and/or all item listings with the metadata identifier regardless of seller.

Metrics are generated at block 508 by aggregating data from the part item listings identified at block 506. In accordance with various aspects of the technology described herein, the process of identifying item listings for a given metadata identifier and generating metrics based on those item listings can be done at runtime (e.g., when a user interface with inventory intelligence is requested by a user device) or can be performed offline and stored (e.g., so the generated metrics can be retrieved from storage at runtime).

A user interface with metrics based on the aggregated data is generated, as shown at block 510. By way of example only and not limitation, a user interface such as the user interface 300 of FIG. 3 or the user interface 400 of FIG. 4 could be generated.

As shown at block 512, the user interface is provided to a user device for presentation. For instance, in the context of FIG. 1, the user interface (or user interface data) could be communicated from the inventory intelligence system 106 over the network 110 to the user device 102 for presentation via the application 108.

Turning next to FIG. 6, a flow diagram is provided showing a method 600 for providing metrics for a seller's existing inventory using metadata identifiers. The method 600 could be performed, for instance, by the inventory intelligence system 106 of FIG. 1. As shown at block 602, listing data for part item listings in a seller's inventory on a listing platform is accessed. Based on the listing data, metadata identifiers for each part item listing is identified as shown at block 604.

Metrics are accessed based on aggregated data for each metadata identifier, as shown at block 606. In some aspects, the metrics for each metadata identifier are generated at runtime, for instance, by identifying item listings having the metadata identifier and aggregating data from those item listings to generate the metrics. In other aspects, the metrics are generated offline and stored such that they can be retrieved at runtime.

A user interface with metrics based on the aggregated data is generated, as shown at block 608. By way of example only and not limitation, a user interface such as the user interface 300 of FIG. 3 could be generated to provide metrics for metadata identifiers of item listings in the seller's inventory on the listing platform.

As shown at block 610, the user interface is provided to a user device for presentation. For instance, in the context of FIG. 1, the user interface (or user interface data) could be communicated from the inventory intelligence system 106 over the network 110 to the user device 102 for presentation via the application 108.

Figure 7:
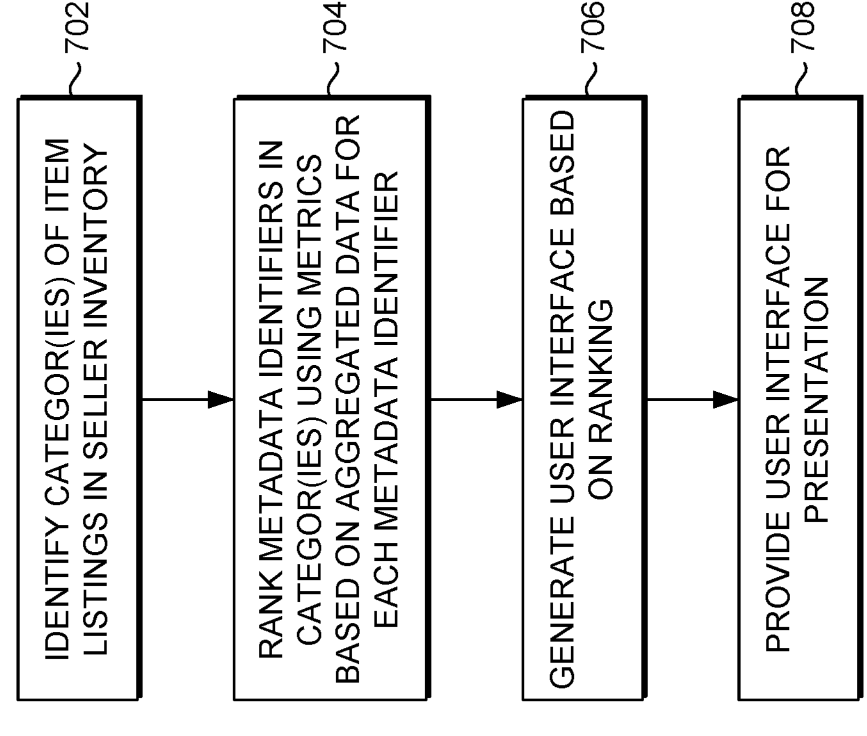
FIG. 7 is a flow diagram showing a method for providing metrics for new opportunities based on a seller's existing inventory using metadata identifiers in accordance with some implementations of the present disclosure.

With reference now to FIG. 7, a flow diagram is provided showing a method 700 for providing metrics for new opportunities based on a seller's existing inventory using metadata identifiers. The method 700 could be performed, for instance, by the inventory intelligence system 106 of FIG. 1. As shown at block 702, one or more categories of part item listings in a seller's inventory on a listing platform are identified. The one or more categories can be identified, for instance, by accessing listing data for each part item listing in the seller's inventory on the listing platform.

Metadata identifiers in the one or more categories are ranked based on metrics for each metadata identifier, as shown at block 704. This could include identifying metadata identifiers having a category identifier corresponding to one of the one or more categories, accessing metrics based on aggregated data for those metadata identifiers, and ranking the metadata identifiers based on the metrics.

A user interface is generated based on the rankings, as shown at block 706. By way of example only and not limitation, a user interface such as the user interface 400 of FIG. 4 could be generated to provide metrics for metadata identifiers not in the seller's inventory on the listing platform to provide a list of new opportunities for the seller. The user interface can be generated by ordering at least a portion of the metadata identifiers based on the rankings. In some instances, a subset of metadata identifiers is selected based on the rankings. For instance, the top-N ranked metadata identifiers could be selected.

As shown at block 708, the user interface is provided to a user device for presentation. For instance, in the context of FIG. 1, the user interface (or user interface data) could be communicated from the inventory intelligence system 106 over the network 110 to the user device 102 for presentation via the application 108.

Exemplary Operating Environment

Figure 8:
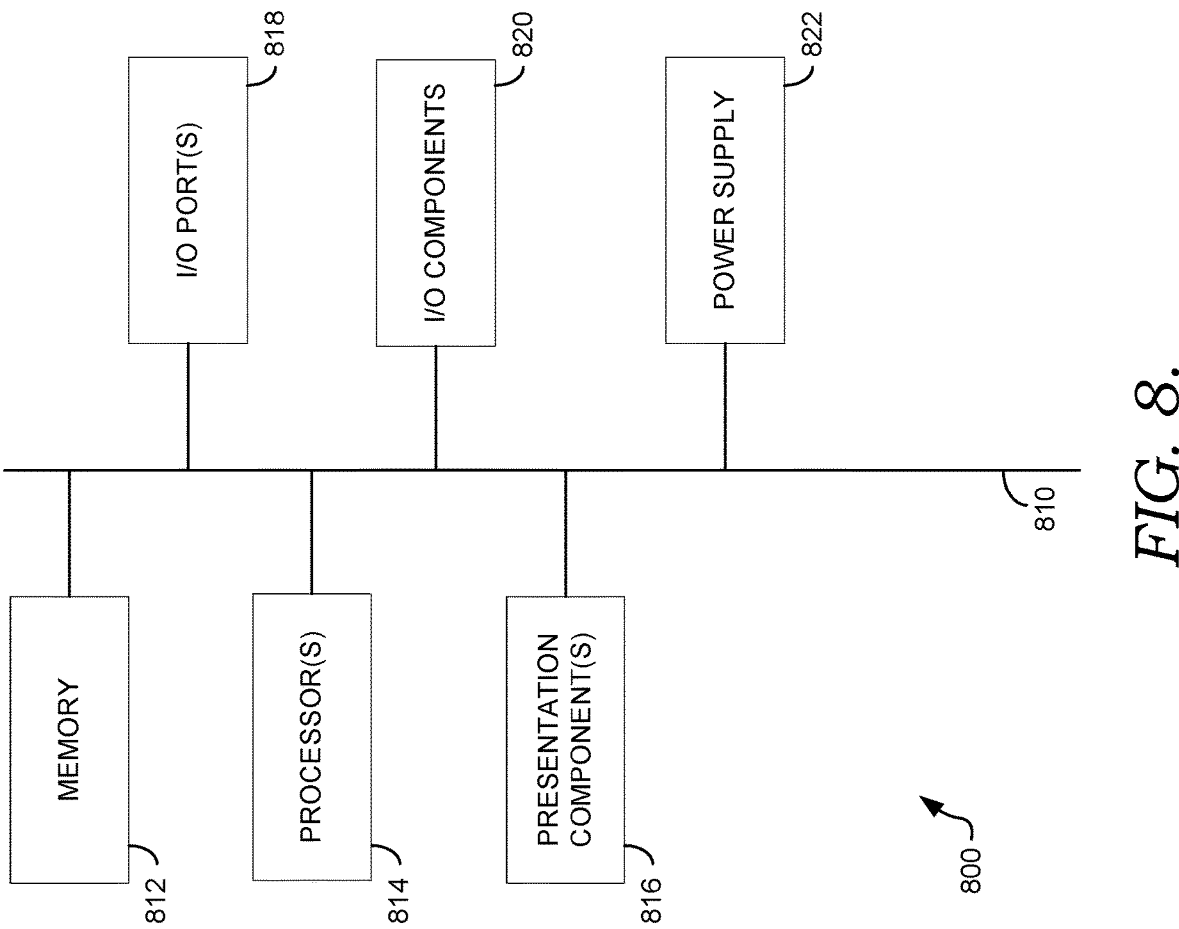
FIG. 8 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 8 in particular, an exemplary operating environment for implementing embodiments of the present technology is shown and designated generally as computing device 800. Computing device 800 is but one example of a suitable computing environment and is not intended to suggest any limitation as to the scope of use or functionality of the technology. Neither should the computing device 800 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what can be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory can be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which can be built in. Illustrative components include a microphone, joystick, game pad, satellite dish, scanner, printer, wireless device, etc. The I/O components 820 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 can be equipped with depth cameras, such as, stereoscopic camera systems, infrared camera systems, RGB camera systems, and combinations of these for gesture detection and recognition. Additionally, the computing device 800 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations, the operations comprising:
- accessing, for each of a plurality of part item listings on a listing platform, listing data comprising structured data and unstructured text;
- for each part item listing, generating a metadata identifier comprising a combination of an inventory segment identifier, a category identifier, and fitment data identifying compatibility of a part item for the part item listing with one or more automobiles, wherein generating the metadata identifier for a first part item listing from the plurality of part item listings comprises: in response to determining structured data from listing data for the first part item listing lacks information to determine at least one of the segment identifier, the category identifier, or the fitment data for the first part item listing, performing natural language processing of the unstructured text from the listing data for the first part item listing to identify the at least one of the inventory segment identifier, the category identifier, and the fitment data for the first part item listing missing from the structured data for the first part item listing;
- storing, in a datastore of the listing platform, associations between part item listings and metadata identifiers;
- receiving an indication of a first metadata identifier comprising a combination of a first inventory segment identifier, a first category identifier, and a first fitment data;
- identifying, from the plurality of part item listings using the associations between part item listings and metadata identifiers, a set of part item listings having metadata identifiers that match the first metadata identifier;
- determining that part items of the set of part item listings are interchangeable based on the set of part item listings having metadata identifiers having the combination of the first inventory segment identifier, the first category identifier, and the first fitment data;
- aggregating demand data and/or supply data for the set of part item listings to provide aggregated data; and
- generating a user interface with one or more metrics using the aggregated data.

2. The one or more computer storage media of claim 1, wherein the inventory segment identifier for the metadata identifier for each part item listing is selected from the following: salvage, original equipment, after market, and private label.

3. The one or more computer storage media of claim 1, wherein the category identifier for the metadata identifier for each part item listing is selected from a category hierarchy for the listing platform.

4. The one or more computer storage media of claim 1, wherein the fitment data for the metadata identifier for each part item listing comprises one or more selected from the following: a make, a model, a trim, an engine, and a year.

5. The one or more computer storage media of claim 1, wherein receiving the indication of the first metadata identifier comprises:
- receiving listing data for a new part item listing to be added to the listing platform; and
- determining the first metadata identifier based on the listing data for the new part item listing.

6. The one or more computer storage media of claim 1, wherein receiving the indication of the first metadata identifier comprises:
- identifying, in an item listing inventory of a seller, a first part item listing having the first metadata identifier.

7. The one or more computer storage media of claim 1, wherein receiving the indication of the first metadata identifier comprises:
- identifying one or more categories of part item listings in an item listing inventory of a seller;
- ranking a plurality of metadata identifiers having one of the one or more categories based on one or more metrics associated with the metadata identifiers; and
- selecting the first metadata identifier based on ranking the plurality of metadata identifiers.

8. A computer-implemented method comprising:
- accessing listing data comprising structured data and unstructured text for each of a plurality of part item listings in a seller inventory on a listing platform;
- generating metadata identifiers for the plurality of part item listings, each metadata identifier for each part item listing comprising a combination of an inventory segment identifier, a category identifier, and fitment data identifying compatibility of a part item for the part item listing with one or more automobiles, wherein generating the metadata identifier for a first part item listing from the plurality of part item listings comprises: in response to determining structured data from listing data for the first part item listing lacks information to determine at least one of the segment identifier, the category identifier, or the fitment data for the first part item listing, performing natural language processing of the unstructured text from the listing data for the first part item listing to identify the at least one of the inventory segment identifier, the category identifier, and the fitment data for the first part item listing missing from the structured data for the first part item listing;
- storing, in a datastore of the listing platform, associations between the metadata identifiers and the plurality of part item listings;

for each of the metadata identifiers, determining one or more part item listings from one or more other seller inventories on the listing platform are interchangeable with one or more part item listings from the seller inventory based on data stored in the datastore of the listing platform identifying associations between the metadata identifiers and part item listings in the one or more other seller inventories;

accessing metrics for each of the metadata identifiers by aggregating metrics data for the one or more part item listings in the one or more other seller inventories for each metadata identifier; and generating a user interface identifying each metadata identifier and the metrics for each metadata identifier.

9. The computer-implemented method of claim 8, wherein the inventory segment identifier for the metadata identifier for each part item listing is selected from the following: salvage, original equipment, after market, and private label.

10. The computer-implemented method of claim 8, wherein the category identifier for the metadata identifier for each part item listing is selected from a category hierarchy for the listing platform.

11. The computer-implemented method of claim 8, wherein the fitment data for the metadata identifier for each part item listing comprises one or more selected from the following: a make, a model, a trim, an engine, and a year.

12. A computer system comprising:

a processor; and a computer storage medium storing computer-useable instructions that, when used by the processor, causes the computer system to perform operations comprising:

accessing, for each of a plurality of part item listings on a listing platform, listing data comprising structured data and unstructured text;

for each part item listing, generating a metadata identifier comprising a combination of an inventory segment identifier, a category identifier, and fitment data identifying compatibility of a part item for the part item listing with one or more automobiles, wherein generating the metadata identifier for a first part item listing from the plurality of part item listings comprises: in response to determining structured data from listing data for the first part item listing lacks information to determine at least one of the segment identifier, the category identifier, or the fitment data for the first part item listing, performing natural language processing of the unstructured text from the listing data for the first part item listing to identify the at least one of the inventory segment identifier, the category identifier, and the fitment data for the first part item listing missing from the structured data for the first part item listing;

storing, in a datastore of the listing platform, associations between part item listings and metadata identifiers;

identifying one or more categories of part item listings in a seller inventory on the listing platform;

ranking metadata identifiers in the one or more categories using metrics for the metadata identifiers, the metrics for a first metadata identifier having been generated by aggregating data across part item listings on the listing platform having the first metadata identifier based on the associations in the datastore of the listing platform; and generating a user interface with at least a subset of the metadata identifiers based on the ranking.

13. The computer system of claim 12, wherein the inventory segment identifier for the metadata identifier for each part item listing is selected from the following: salvage, original equipment, after market, and private label.

14. The computer system of claim 12, wherein the category identifier for the metadata identifier for each part item listing is selected from a category hierarchy for the listing platform.

15. The computer system of claim 12, wherein the fitment data for the metadata identifier for each part item listing comprises one or more selected from the following: a make, a model, a trim, an engine, and a year.

* * * * *